(12) United States Patent
Ogiwara

(10) Patent No.: US 9,533,563 B2
(45) Date of Patent: Jan. 3, 2017

(54) REDUCTION GEAR

(71) Applicant: KABUSHIKI KAISHA TOYOTA JIDOSHOKKI, Kariya-shi, Aichi-ken (JP)

(72) Inventor: Takashi Ogiwara, Aichi-ken (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 14/975,816

(22) Filed: Dec. 20, 2015

(65) Prior Publication Data

US 2016/0186852 A1 Jun. 30, 2016

(30) Foreign Application Priority Data

Dec. 26, 2014 (JP) ................. 2014-264759

(51) Int. Cl.
| | |
|---|---|
| F16H 55/17 | (2006.01) |
| B60K 7/00 | (2006.01) |
| B60K 17/04 | (2006.01) |
| F16D 1/06 | (2006.01) |
| F16H 57/00 | (2012.01) |

(52) U.S. Cl.
CPC ........... B60K 7/0007 (2013.01); B60K 17/046 (2013.01); F16D 1/06 (2013.01); F16H 57/0025 (2013.01)

(58) Field of Classification Search
CPC .............. F16H 55/0873; F16H 57/0025; F16H 2055/176; F16H 57/0018; F16D 2023/0662; F16D 2001/103; B60K 17/046

USPC ................. 74/457, 460, 462, 438; 403/359.6
See application file for complete search history.

(56) References Cited

U.S. PATENT DOCUMENTS

| | | | | |
|---|---|---|---|---|
| 4,416,650 A | * | 11/1983 | Wilkins ................. | B65G 39/02 198/789 |
| 4,509,381 A | * | 4/1985 | Ikemoto .................... | F16H 3/16 29/525 |
| 5,527,126 A | * | 6/1996 | Digel ..................... | B60K 17/22 403/280 |
| 5,660,494 A | * | 8/1997 | Schwarzler ........... | F16D 1/0858 403/359.6 |
| 5,716,156 A | * | 2/1998 | Bayer ..................... | F16D 1/072 403/280 |

(Continued)

FOREIGN PATENT DOCUMENTS

| | | |
|---|---|---|
| JP | 2005-029117 A | 2/2005 |
| JP | 2007-127140 A | 5/2007 |

*Primary Examiner* — William Kelleher
*Assistant Examiner* — Jake Cook
(74) *Attorney, Agent, or Firm* — Sughrue Mion, PLLC

(57) ABSTRACT

A reduction gear includes a shaft that has a gear portion and a ring gear that is mounted on the shaft at a position away from the gear portion. The shaft has at the position in the outer periphery thereof a plurality of stepped first teeth arranged along the circumferential direction of the shaft. Each first tooth has a lower portion and a higher portion that is higher than and contiguous to the lower portion in the axial direction of the shaft, and the higher portion having a step surface that is contiguous to the lower portion. The ring gear has in the inner periphery thereof a plurality of second teeth arranged along the inner circumference of the ring gear, and the second teeth are fitted to grooves between the first teeth through splines. The second teeth are set in contact with the step surfaces of the first teeth.

4 Claims, 3 Drawing Sheets

(56) References Cited

U.S. PATENT DOCUMENTS

| | | | | |
|---|---|---|---|---|
| 6,698,078 B2* | 3/2004 | Prucher | ............... | B60K 17/165 29/428 |
| 2002/0085858 A1* | 7/2002 | Yamaguchi | ............... | F16D 1/06 399/167 |
| 2008/0152424 A1* | 6/2008 | Igarashi | ................. | F16D 1/101 403/359.6 |

* cited by examiner

REDUCTION GEAR

BACKGROUND OF THE INVENTION

The present invention relates to a reduction gear.

Japanese Patent Application Publication 2005-29117 discloses a conventional reduction gear that includes a pinion spur gear connected to a motor shaft and a large spur gear meshing with the pinion gear. The large spur gear includes a shaft portion, a flange portion and a gear portion. A sun gear is integrally formed with the shaft portion. The sun gear meshes with a plurality of planetary gears, and each planetary gear meshes with a ring gear.

In the above-described reduction gear, the shaft portion and flange portion of the large spur gear are formed integrally. This configuration makes the shape of the large spur gear complex and the manufacturing of the large spur gear difficult, with the result that the production cost may increase. Therefore, it is desirable to form the shaft portion of the large spur gear with which the sun gear is formed integrally and the flange portion having a gear portion separately.

In assembling a shaft having a gear portion and a ring gear that is provided separately from the shaft, the shaft and the ring gear may be fixed together by press-fit, shrink fit, expansion fit or spline fit. With such press-fit, shrink fit and expansion fit, when large torque is transmitted from the ring gear to the shaft, relative rotation may occur between the shaft and the ring gear due to slipping of the ring gear on the shaft. Although the spline fit may prevent the ring gear from slipping relative to the shaft, the shaft and the ring gear are likely to be dislocated relative to each other in the axial direction, so that precise positioning of the shaft and the ring gear in the axial direction becomes difficult.

The present invention, which has been made in light of the above problems, is directed to providing a reduction gear that prevents the relative rotation of the shaft and a ring gear and permits precise positioning of the shaft and the ring gear in the axial direction thereof.

SUMMARY OF THE INVENTION

In accordance with an aspect of the present invention, there is provided a reduction gear including a shaft that includes a gear portion and a ring gear that is mounted on the shaft at a position that is away from the gear portion of the shaft. The shaft has at the position in the outer periphery thereof a plurality of stepped first teeth arranged along the circumferential direction of the shaft. Each first tooth has a lower portion and a higher portion that is higher than and contiguous to the lower portion in the axial direction of the shaft. The ring gear has in the inner periphery thereof a plurality of second teeth arranged along the inner circumference of the ring gear, and the second teeth are fitted to grooves between the first teeth through splines. The second teeth are set in contact with the step surfaces of the first teeth.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE EMBODIMENTS

Figure 1:
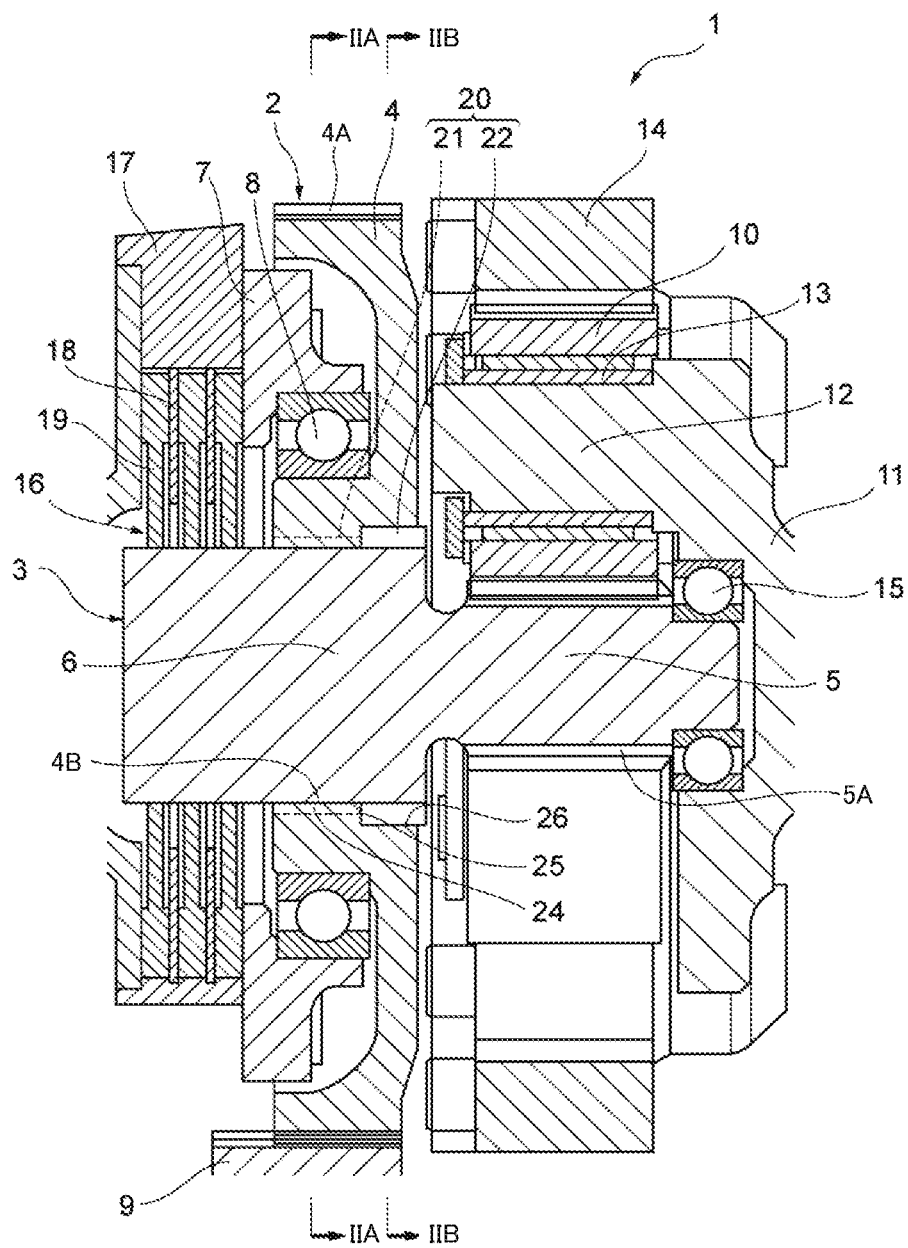
FIG. 1 is a cross-sectional view of a diving device provided with a reduction gear according an embodiment of the present invention.

The following will describe an embodiment of the present invention with reference to the accompanying drawings. For the sake of the description, like or same parts or elements among different embodiments are designated by the same reference numerals and the description thereof will be not reiterated.

Referring to FIG. 1, there is shown a driving device 1 that drives to rotate a wheel (not shown) of a vehicle. The driving device 1 is provided with a two-stage reduction gear 2.

The reduction gear 2 includes a shaft 3 extending in the vehicle width direction and a ring gear 4 that is mounted on the shaft 3.

The shaft 3 has a gear portion 5 forming a sun gear and a mounting portion 6 on which the ring gear 4 is mounted. The mounting portion 6 is located inward (leftward in FIG. 1) of the gear portion 5 in the vehicle width direction. In other words, the mounting portion 6 is disposed at a position away from the gear portion 5 of the shaft 3 in the axial direction thereof. The mounting portion 6 has a diameter that is greater than that of the gear portion 5. A plurality of teeth 5A is formed around the gear portion 5 of the shaft 3.

The ring gear 4 is mounted on the mounting portion 6 of the shaft 3 and rotatably supported by a gear support member 7 that is fixed to a housing (not shown) via a bearing 8. The bearing 8 is arranged so as to restrict the ring gear 4 from moving inwardly in the vehicle width direction. The ring gear 4 has in the outer periphery thereof a plurality of teeth 4A. The ring gear 4 meshes with a pinion gear 9 that is connected to a motor shaft (not shown). Structure for mounting the ring gear 4 on the shaft 3 will be described later.

A plurality of planetary gears 10 (for example, three planetary gears) meshes with the gear portion 5 forming the sun gear. Each planetary gear 10 is mounted on a pin 12 projecting from the end of an axle shaft 11 via cylindrical member 13. The axle shaft 11 is fixed to the wheel (not shown) of the vehicle. In addition, each planetary gear 10 meshes with an internal gear 14 that is fixed to the housing (not shown). A bearing 15 is interposed between the end of the axle shaft 11 and the outer end of the shaft 3.

When the motor shaft (not shown) rotates in this reduction gear 2, the rotation of the motor shaft is transmitted through the pinion gear 9 and the ring gear 4 to the shaft 3. Thus, the gear portion 5 of the shaft 3 is rotated thereby to cause the planetary gears 10 to revolve around the gear portion 5. The axle shaft 11 is rotated and the wheel (not shown) is rotated, accordingly.

In addition, the driving device 1 is provided with a wet disk brake 16 for braking the wheel. The wet disk brake 16 includes a plurality of outer brake disks 18 that are supported by a disk support member 17 fixed to the housing (not shown) and a plurality of inner brake disks 19 that is supported by the mounting portion 6 of the shaft 3. The inner brake disks 19 are fixed to the outer periphery of the mounting portion 6 at positions opposite from the gear portion 5. The outer brake disks 18 and the inner brake disks 19 are alternately arranged.

Figure 2A:
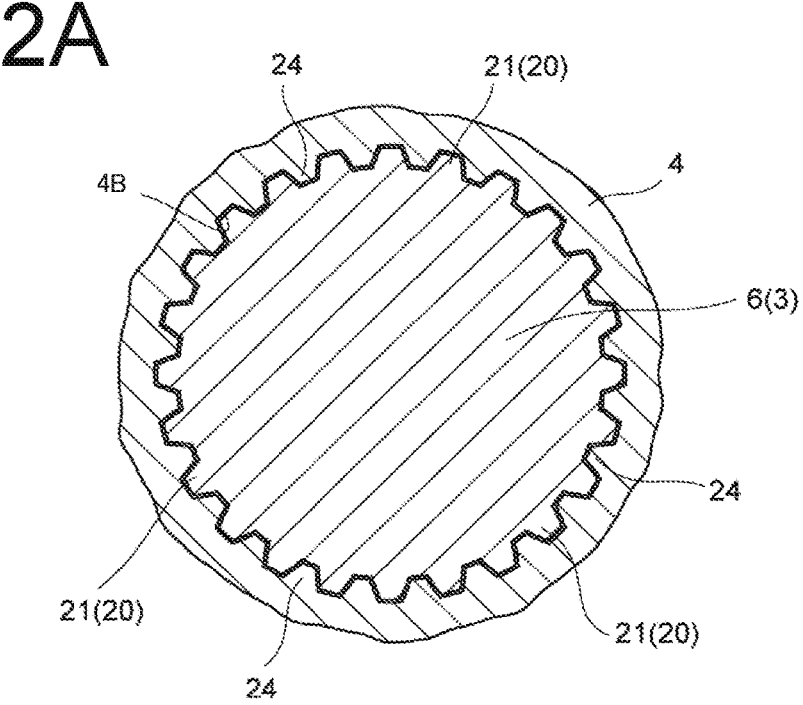
FIG. 2A and FIG. 2B are cross-sectional views of the driving device taken along lines IIA-IIA and IIB-IIB of FIG. 1, respectively, showing mounting of a shaft and a ring gear.
Figure 2B:
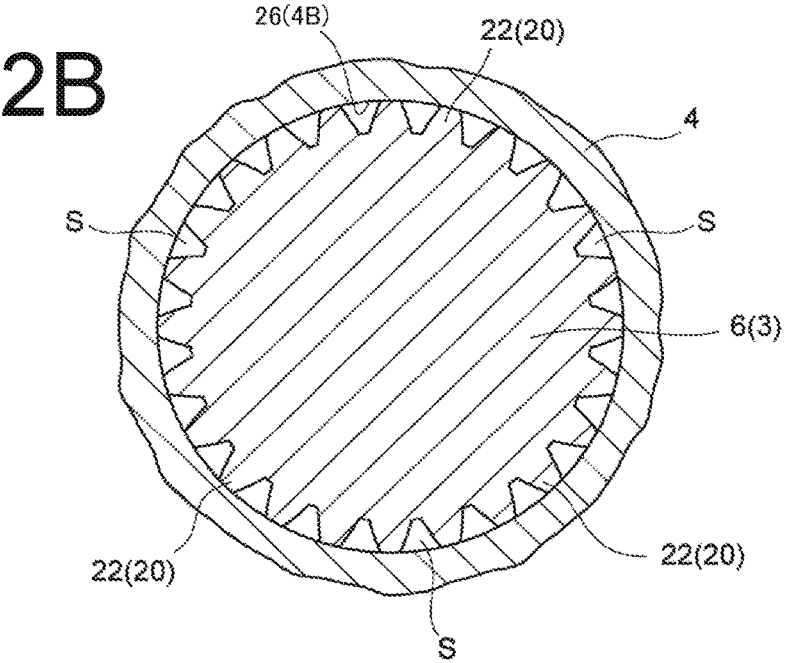
Figure 3:
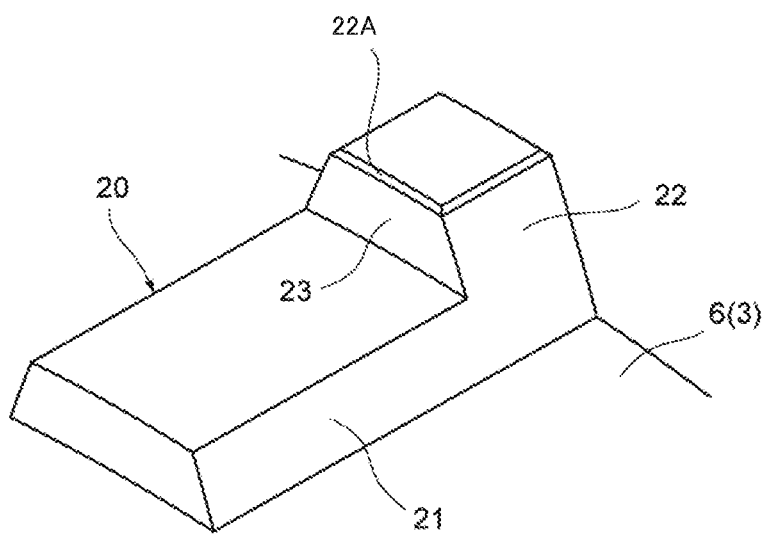
FIG. 3 is a perspective view of a mounting portion that is formed in the shaft.

The following will describe the mounting of the shaft 3 of the ring gear 4 on the shaft with reference to FIGS. 1 to 3.

A plurality of stepped first teeth 20 is formed in the outer periphery of the mounting portion 6 of the shaft 3 and arranged along the circumference direction of the shaft 3. Each first tooth 20 include a lower portion 21 and a higher portion 22 that is disposed in side-by-side relation to and outward of the lower portion 21 in the vehicle width direction. In other words, the higher portion 22 is disposed contiguous to the lower portion 21 in the axial direction of the shaft 3. The higher portion 22 has a step surface that is contiguous to the lower portion 21.

The end surface of the higher portion 22 is curved in an arc shape and a top surface of each higher portion has at an edge thereof a chamfer 22A. The dimension of the higher portion 22 as measured from the surface of the mounting portion 6 of the shaft 3 to the end surface of the higher portion 22 is about twice as large as that of the lower portion 21.

The shaft 3 that includes the mounting portion 6 having a plurality of the first teeth 20 may be formed as follows. Firstly, a round bar is cut, or turned, on a lathe into a shaft of a desired shape having a stepped portion in the region corresponding to the mounting portion 6. Then, gears are cut on the shaft workpiece to form a plurality of the first teeth 20 and the teeth 5A at positions corresponding to the mounting portions 6 and the gear portion 5, respectively. As a result, the shaft 3 including the gear portion 5 and the mounting portion 6 is made.

The ring gear 4 has a hole 4B through which the mounting portion 6 of the shaft 3 is inserted. The ring gear 4 has in the inner periphery thereof a plurality of second teeth 24 that is formed in the inner periphery of the hole 4B of the ring gear 4 and arranged along the circumferential direction of the ring gear 4, and the second teeth 24 are fitted to grooves between the lower portion 21 of the first teeth 20 through splines. In other words, the second teeth 24 and the grooves between the lower portions 21 of the first teeth 20 are spline-fitted. The second tooth 24 has a contact surface 25 that is brought into contact with the step surface 23 of the first tooth 20.

The ring gear 4 further has in the inner periphery thereof a fixing portion 26 disposed in side-by-side relation to and outward of the second teeth 24 in the vehicle width direction, and the higher portion 22 of the plurality of the first teeth 20 is press-fitted to the fixing portion 26. In other words, the fixing portion 26 is disposed contiguous to the second tooth 24 in the axial direction of the ring gear 4 and is configured to fix the higher portion 22 of the first teeth 20. The fixing portion 26 forms a cylindrical hole. With the higher portion 22 of each first tooth 20 press-fitted to the fixing portion 26, the end surface of the higher portion 22 of the first tooth 20 is in contact with the fixing portion 26. Then, a space S is formed by the fixing portion 26, the outer periphery of the mounting portion 6 and the side surface of the first tooth 20.

As with the case of the shaft 3, the ring gear 4 is formed by tuning and gear cutting.

In assembling the shaft 3 and the ring gear 4, the mounting portion 6 of the shaft 3 is inserted through the hole 4B of the ring gear 4 from the side of the fixing portion 26. By so doing, the lower portion 21 of the first tooth 20 of the shaft 3 is spline-fitted to the second tooth 24 of the ring gear 4 and the higher portion 22 of the first tooth 20 is press-fitted to the fixing portion 26 of the ring gear 4. In other words, the second teeth 24 are fitted to grooves between the lower portions 21 of the first teeth 20.

With the contact surface 25 of the second tooth 24 set in contact with the step surface 23 of the first tooth 20, the ring gear 4 is restricted from moving outwardly in the vehicle width direction. As a result, the ring gear 4 is axially held by the step surface 23 of the first tooth 20 and the bearing 8, that is, the ring gear 4 is axially positioned with respect to the mounting portion 6.

As has been described above, the plurality of first teeth 20 that are disposed along the outer circumference of the mounting portion 6 of the shaft 3 and the plurality of second teeth 24 that are disposed along the inner circumference of the ring gear 4 are engaged with each other, and more specifically, the second teeth are fitted to grooves between the first teeth through splines. In other words, the second teeth 24 and the grooves between the first teeth 20 are spline-fitted. This configuration prevents the ring gear 4 from slipping relative to the shaft 3 in the rotational direction thereof, so that no relative rotation occurs between the shaft 3 and the ring gear 4. As a result, the torque of the ring gear 4 is successfully transmitted to the shaft 3.

The first tooth 20 has the lower portion 21 and the higher portion 22 that is disposed a contiguous to the respective lower portion 21 in the axial direction of the shaft 3, and the second tooth 24 is set in contact with the step surface 23 formed between the lower portion 21 and the higher portion 22, which restricts the shaft 3 and the ring gear 4 from relative movement in the axial direction and permits precise positioning of the shaft 3 and the ring gear 4. Therefore, no additional part such as a snap ring is required for axial positioning of the shaft 3 and the ring gear 4, so that the production cost of the reduction gear may be reduced.

In addition, the higher portion 22 of the plurality of first teeth 20 is fixed to the fixing portion 26 formed in the inner periphery of the ring gear 4, so that the shaft 3 and the ring gear 4 are coaxially aligned and the first tooth 20 and the second tooth 24 are fitted securely, with the result that noise generation and chipping of the first teeth 20 and the second teeth 24 may be prevented.

The fixing portion 26 forming a cylindrical hole, which has a circular shape in cross section, may be formed easily.

The formation of the chamfer 22A in the higher portion 22 of the first tooth 20 prevents the chipping of the edge of the higher portion 22 in press-fitting the mounting portion 6 of the shaft 3 in the fixing portion 26 of the ring gear 4 and also facilitates such press-fitting operation.

The configuration of the first tooth 20 that includes the lower portion 21 having a height that is about the half the height of the higher portion 22 ensures the smooth spline-fitting between the lower portions 21 and the second teeth 24 and contact between the second teeth 24 and the step surface 23 of the first teeth 20.

The stepped first tooth 20 is formed simultaneously with machining of the shaft 3 by turning. Because no additional machining process is required, the production cost is not increased.

The present invention is not limited to the above-described embodiments but may be modified in various manners as exemplified below.

In the plurality of the first teeth 20, the higher portion 22 may be disposed inward of the lower portion 21 in the vehicle width direction. In this case, the fixing portion 26 is disposed inward of the second teeth 24 in the ring gear 4 in the vehicle width direction.

The top surface of the higher portion 22 of the first tooth 20 may not necessarily include the chamfer 22A.

Instead of forming the fixing portion 26 having a circular shape in cross section, a plurality of teeth may be formed in the inner periphery of the ring gear 4 for spline-fitting with the higher portion 22 of the first tooth 20. In other words, the second tooth 24 that is formed in the inner periphery of the ring gear 4 may have a stepped shape that is similar to the first teeth 20.

The higher portion 22 of each first tooth 20 need not be fixed to the inner peripheral surface of the ring gear 4.

Although the reduction gear 2 of the present embodiment is adapted for use in the driving device 1 that is provided with the wet disk brake 16, the reduction gear 2 is applicable to a driving device having no disk brake. In addition, the use of the reduction gear 2 is not limited to the driving device that drives to rotate a wheel of a vehicle, but it is applicable to any other driving device than that for a vehicle.

The reduction gear 2 is not limited to a two stage reduction gear as long as the reduction gear is provided with a shaft including a gear portion and a ring gear mounted on the shaft. In this case, the reduction gear may be so configured that the rotation of the ring gear is transmitted to the shaft portion or the rotation of the shaft is transmitted to the ring gear.

What is claimed is:

1. A reduction gear comprising:
   a shaft including a gear portion; and
   a ring gear mounted to the shaft at a position away from the gear portion of the shaft,
   wherein the shaft has at the position in the outer periphery thereof a plurality of stepped first teeth arranged along the circumferential direction of the shaft,
   wherein each first tooth has a lower portion and a higher portion that is higher than and contiguous to the lower portion in the axial direction of the shaft, the higher portion having a step surface that is contiguous to the lower portion,
   wherein the ring gear has in the inner periphery thereof a plurality of second teeth arranged along the inner circumference of the ring gear, wherein the second teeth are fitted to grooves between the first teeth through splines; and
   wherein the second teeth are set in contact with the step surfaces of the first teeth.

2. The reduction gear according to claim 1, wherein the second teeth are fitted to grooves between the lower portions of the first teeth through splines, wherein the ring gear has in the inner periphery thereof a fixing portion that is contiguous to the second teeth in the axial direction of the ring gear, and wherein the fixing portion is configured to fix the higher portions of the first teeth.

3. The reduction gear according to claim 2, wherein the fixing portion forms a cylindrical hole.

4. The reduction gear according to claim 2, wherein a top surface of each higher portion has at an edge thereof a chamfer.

* * * * *